(12) United States Patent
O'Sullivan et al.

(10) Patent No.: US 8,180,657 B2
(45) Date of Patent: May 15, 2012

(54) SYSTEM AND METHOD FOR EVENT SLOT NEGOTIATION

(75) Inventors: Patrick Joseph O'Sullivan, Ballsbridge (IE); Andrew L. Schirmer, Andover, MA (US); Edith Helen Stern, Yorktown Heights, NY (US); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 11/967,824

(22) Filed: Dec. 31, 2007

(65) Prior Publication Data

US 2009/0171700 A1   Jul. 2, 2009

(51) Int. Cl.
  *G06Q 10/00* (2006.01)
(52) U.S. Cl. ....... 705/5; 705/6; 705/8; 705/26; 715/751; 715/753
(58) Field of Classification Search .................. 705/5, 1, 705/6, 8, 26; 715/751, 753
See application file for complete search history.

(56) References Cited

U.S. PATENT DOCUMENTS

| | | | | |
|---|---|---|---|---|
| 4,937,743 A * | 6/1990 | Rassman et al. | ................... | 705/8 |
| 5,933,810 A * | 8/1999 | Okawa | ................... | 705/5 |
| 6,101,480 A * | 8/2000 | Conmy et al. | ................... | 705/7.18 |
| 6,523,012 B1 | 2/2003 | Glassman et al. | | |
| 7,225,442 B2 * | 5/2007 | Dutta et al. | ................... | 718/100 |
| 7,236,976 B2 * | 6/2007 | Breitenbach et al. | ................... | 1/1 |
| 2003/0036941 A1 * | 2/2003 | Leska et al. | ................... | 705/9 |
| 2004/0034774 A1 | 2/2004 | Le Saint | | |
| 2004/0073530 A1 | 4/2004 | Stringer-Calvert et al. | | |
| 2004/0073801 A1 | 4/2004 | Kalogridis et al. | | |
| 2004/0128179 A1 * | 7/2004 | Mashiko et al. | ................... | 705/8 |
| 2004/0267623 A1 * | 12/2004 | Vivadelli et al. | ................... | 705/26 |
| 2005/0033813 A1 | 2/2005 | Bhogal et al. | | |
| 2005/0050061 A1 * | 3/2005 | Karstens | ................... | 707/100 |
| 2005/0071213 A1 * | 3/2005 | Kumhyr et al. | ................... | 705/8 |
| 2005/0177409 A1 | 8/2005 | Barni | | |
| 2005/0197877 A1 * | 9/2005 | Kalinoski | ................... | 705/8 |
| 2005/0273372 A1 * | 12/2005 | Bowne et al. | ................... | 705/5 |
| 2005/0288987 A1 | 12/2005 | Sattler et al. | | |
| 2006/0218027 A1 * | 9/2006 | Carrion | ................... | 705/8 |
| 2007/0005406 A1 | 1/2007 | Assadian et al. | | |
| 2007/0162315 A1 * | 7/2007 | Hodges | ................... | 705/8 |
| 2007/0239506 A1 * | 10/2007 | Jania et al. | ................... | 705/8 |

(Continued)

FOREIGN PATENT DOCUMENTS

EP   1 411 430   4/2004

(Continued)

*Primary Examiner* — John Hayes
*Assistant Examiner* — Brian Epstein
(74) *Attorney, Agent, or Firm* — Holland & Knight LLP; Brian J. Colandreo, Esq.; Mia K. Fiedler, Esq.

(57) ABSTRACT

A method and computer program product for receiving a slot request, from a second respondent having a second seniority level, for an original event slot that was previously reserved by a first respondent having a first seniority level. The second seniority level is compared to the first seniority level. If the second seniority level exceeds the first seniority level: the reservation of the original event slot by the first respondent is cancelled, and the event slot request for the original event slot by the second respondent is accepted.

20 Claims, 3 Drawing Sheets

U.S. PATENT DOCUMENTS

2007/0276846 A1* 11/2007 Ramanathan et al. ........ 707/100
2007/0288278 A1* 12/2007 Alexander et al. ................. 705/8
2007/0300163 A1* 12/2007 Alford et al. .................. 715/751
2008/0120150 A1* 5/2008 McSheffrey et al. ............. 705/7
2009/0055240 A1* 2/2009 Gartner ............................ 705/8
2009/0094532 A1* 4/2009 Lyle et al. ..................... 715/753
2009/0171700 A1* 7/2009 O'Sullivan et al. ............... 705/5

FOREIGN PATENT DOCUMENTS

WO     WO 2007002226     1/2007

\* cited by examiner

SYSTEM AND METHOD FOR EVENT SLOT NEGOTIATION

TECHNICAL FIELD

This disclosure relates to scheduling events and, more particularly, to prioritizing event slot requests that are received when scheduling events.

BACKGROUND

A meeting moderator is typically placed in charge of planning and executing a meeting. For example, the meeting moderator may be required to obtain space for the meeting, schedule presenters for the various presentation slots of the meeting and invite attendees to the meeting. Unfortunately, it often becomes difficult to schedule the various presenters into the available presentation slots. It is not uncommon for one or more presenters to pressure the meeting moderator into scheduling them into a presentation slot that may be already reserved by another presenter.

Despite numerous attempts to help facilitate meeting scheduling, it remains difficult to gather groups of people, especially when some of the presenters are high-profile members of an organization, typically with very full schedules.

SUMMARY OF DISCLOSURE

In a first implementation, a method includes receiving a slot request, from a second respondent having a second seniority level, for an original event slot that was previously reserved by a first respondent having a first seniority level. The second seniority level is compared to the first seniority level. If the second seniority level exceeds the first seniority level: the reservation of the original event slot by the first respondent is cancelled, and the event slot request for the original event slot by the second respondent is accepted.

One or more of the following features may be included. If the second seniority level does not exceed the first seniority level: the reservation of the original event slot by the first respondent may be maintained, and the slot request for the original event slot by the second respondent may be denied. If the second seniority level does not exceed the first seniority level: the second respondent may be notified that the slot request for the original event slot by the second respondent has been denied; and an alternative event slot may be offered to the second respondent. Offering an alternative event slot to the second respondent may include automatically reserving the alternative event slot for the second respondent.

If the second seniority level exceeds the first seniority level: the original event slot may be reserved for the second respondent, and the first respondent may be notified that the reservation of the original event slot by the first respondent has been cancelled. If the second seniority level exceeds the first seniority level: an alternative event slot may be offered to the first respondent. Offering an alternative event slot to the first respondent may include automatically reserving the alternative event slot for the first respondent.

A newly-available event slot may be offered to one or more potential attendees in an order based, at least in part, upon the seniority level of the one or more potential attendees. One or more non-seniority-based rules may be defined. Comparing the second seniority level to the first seniority level may include applying, at least in part, the one or more non-seniority-based rules to determine whether the reservation of the original event slot by the first respondent is canceled and whether the event slot request for the original event slot by the second respondent is accepted.

In another implementation, a computer program product resides on a computer readable medium that has a plurality of instructions stored on it. When executed by a processor, the instructions cause the processor to perform operations including receiving a slot request, from a second respondent having a second seniority level, for an original event slot that was previously reserved by a first respondent having a first seniority level. The second seniority level is compared to the first seniority level. If the second seniority level exceeds the first seniority level: the reservation of the original event slot by the first respondent is cancelled, and the event slot request for the original event slot by the second respondent is accepted.

One or more of the following features may be included. If the second seniority level does not exceed the first seniority level: the reservation of the original event slot by the first respondent may be maintained, and the slot request for the original event slot by the second respondent may be denied. If the second seniority level does not exceed the first seniority level: the second respondent may be notified that the slot request for the original event slot by the second respondent has been denied; and an alternative event slot may be offered to the second respondent. Offering an alternative event slot to the second respondent may include automatically reserving the alternative event slot for the second respondent.

If the second seniority level exceeds the first seniority level: the original event slot may be reserved for the second respondent, and the first respondent may be notified that the reservation of the original event slot by the first respondent has been cancelled. If the second seniority level exceeds the first seniority level: an alternative event slot may be offered to the first respondent. Offering an alternative event slot to the first respondent may include automatically reserving the alternative event slot for the first respondent.

A newly-available event slot may be offered to one or more potential attendees in an order based, at least in part, upon the seniority level of the one or more potential attendees. One or more non-seniority-based rules may be defined. Comparing the second seniority level to the first seniority level may include applying, at least in part, the one or more non-seniority-based rules to determine whether the reservation of the original event slot by the first respondent is canceled and whether the event slot request for the original event slot by the second respondent is accepted.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
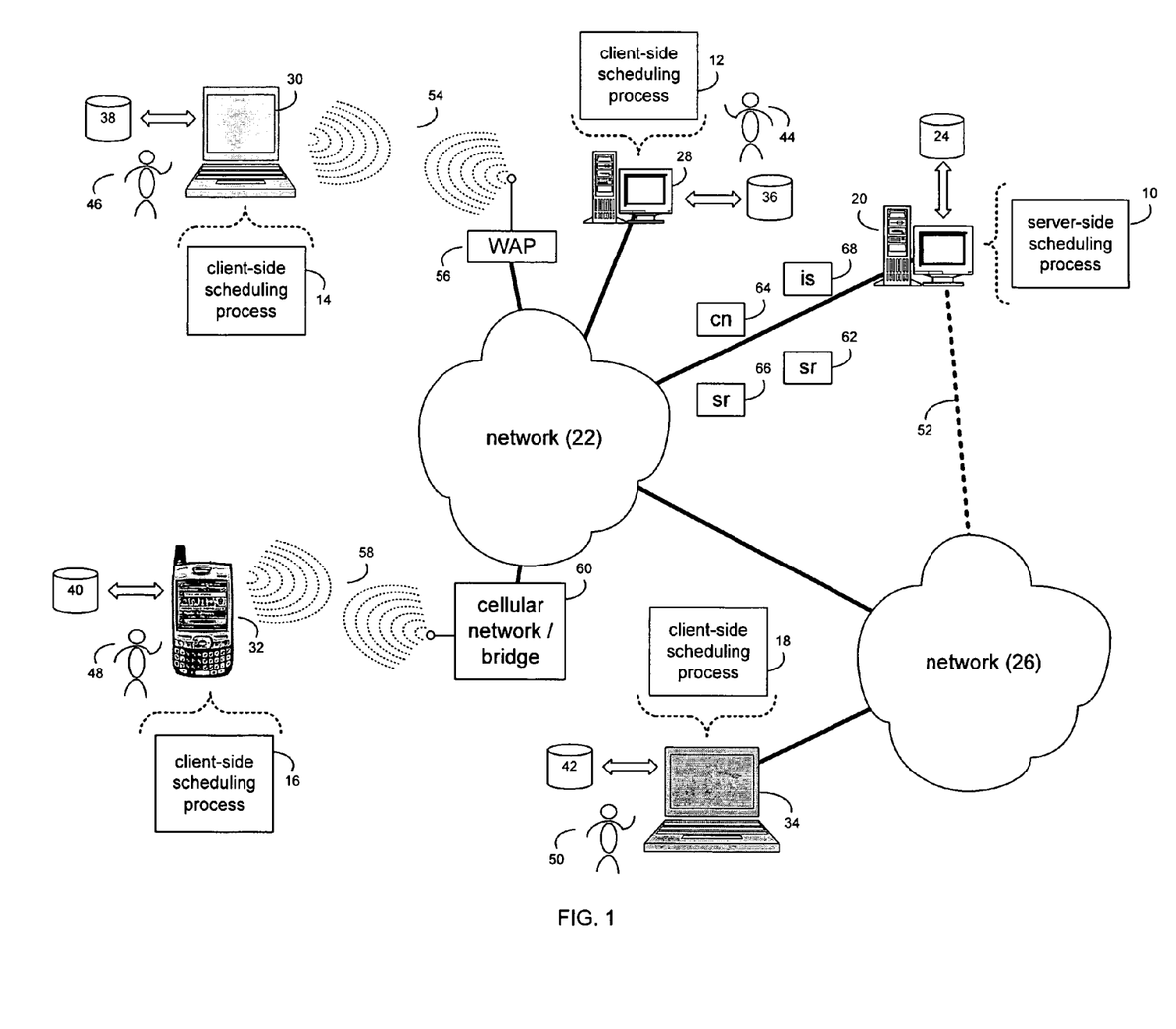
FIG. 1 is a diagrammatic view of a scheduling process coupled to a distributed computing network.

System Overview:

Referring to FIG. 1, there is shown a scheduling process. As will be discussed below, the scheduling process may receive a slot request, from a second respondent having a second seniority level, for an original event slot that was previously reserved by a first respondent having a first seniority level. The second seniority level may be compared to the first seniority level. If the second seniority level exceeds the first seniority level: the reservation of the original event slot by the first respondent may be cancelled, and the event slot request for the original event slot by the second respondent may be accepted.

The scheduling process may be a server-side process (e.g., server-side scheduling process 10), a client-side process (e.g., client-side scheduling process 12, client-side scheduling process 14, client-side scheduling process 16, or client-side scheduling process 18), or a hybrid server-side/client-side process (e.g., the combination of server-side scheduling process 10 and one or more of client-side scheduling processes 12, 14, 16, 18).

Server-side scheduling process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and a mainframe computer. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side scheduling process 10, which may be stored on storage device (e.g., computer readable storage medium) 24 coupled to server computer 20, may be executed by one or more processors (not shown) and one or more memory architectures (not shown) incorporated into server computer 20. Storage device (e.g., computer readable storage medium) 24 may include: a hard disk drive; a tape drive; an optical drive; a RAID array; a random access memory (RAM); and a read-only memory (ROM).

Server computer 20 may execute a web server application, examples of which may include but are not limited to: Microsoft IIS™, Novell Webserver™, or Apache Webserver™, that allows for HTTP (i.e., HyperText Transfer Protocol) access to server computer 20 via network 22. Network 22 may be connected to one or more secondary networks (e.g., network 26), examples of which may include but are not limited to: a local area network; a wide area network; or an intranet, for example.

Client-side scheduling processes 12, 14, 16, 18 may reside on and may be executed by client electronic devices 28, 30, 32, 34 (respectively), examples of which may include but are not limited to personal computer 28, laptop computer 30, personal digital assistant 32, notebook computer 34, a data-enabled, cellular telephone (not shown), and a dedicated network device (not shown), for example. Client electronic devices 28, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side scheduling processes 12, 14, 16, 18, which may be stored on storage devices (e.g., computer readable storage media) 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices (e.g., computer readable storage media) 36, 38, 40, 42 may include: hard disk drives; tape drives; optical drives; RAID arrays; random access memories (RAM); read-only memories (ROM); compact flash (CF) storage devices; secure digital (SD) storage devices; and memory stick storage devices.

Examples of client-side scheduling processes 12, 14, 16, 18 may include but are not limited to a process incorporated into and executed within a client-side calendaring/scheduling application (e.g., Microsoft Outlook™ and Lotus Notes™), which allows a plurality of users (e.g., user 44) to schedule meetings, invite others to meetings, and accept invitations to meetings. Examples of server-side scheduling process 10 may include a process incorporated into and executed within a server-side calendaring/scheduling application (e.g., Microsoft Exchange Server™ and Lotus Domino Server™) Alternatively, client-side scheduling processes 12, 14, 16, 18 and/or server-side scheduling process 10 may be stand-alone applications that work in conjunction with (i.e., interface with) a client-side calendaring/scheduling application and/or a server-side calendaring/scheduling application (respectively). One or more of client-side scheduling processes 12, 14, 16, 18 and server-side scheduling process 10 may interface with each other (via network 22 and/or network 26) to allow a plurality of users (e.g., user 46) to schedule meetings, invite others to meetings, and accept invitations to meetings.

Users 44, 46, 48, 50 may access server-side scheduling process 10 directly through the device on which the client-side scheduling process (e.g., client-side scheduling processes 12, 14, 16, 18) is executed, namely client electronic devices 28, 30, 32, 34, for example. Users 44, 46, 48, 50 may access server-side scheduling process 10 directly through network 22 and/or through secondary network 26. Further, server computer 20 (i.e., the computer that executes server-side scheduling process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 22 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Personal digital assistant 32 is shown wirelessly coupled to network 22 via wireless communication channel 58 established between personal digital assistant 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Scheduling Process:

For the following discussion, server-side scheduling process 10 is going to be described for illustrative purposes, in which client-side scheduling processes 12, 14, 16, 18 are processes incorporated into and executed within a client-side calendaring/scheduling application (e.g., Microsoft Outlook™ and Lotus Notes™) that allow for communication with server-side scheduling process 10. However, this is not intended to be a limitation of this disclosure, as other configurations are possible (e.g., stand-alone, client-side scheduling processes and/or stand-alone server-side scheduling processes).

Assume for illustrative purposes that user 44 of client-side scheduling process 12 was tasked with scheduling a "Q4 2007 Productivity Meeting" that is scheduled to be nine hours long and include nine one-hour event slots. In this particular example, assume that each event slot is to be utilized by a presenter (i.e. an attendee who will present information to the general audience of the "Q4 2007 Productivity Meeting". Assume that in addition to the nine one-hour event slots, a general audience of one-hundred general attendees may attend the meeting to view the presentations provided by the nine presenters.

Using server-side scheduling process 10 (alone or in combination with client-side scheduling process 12), user 44 may schedule the "Q4 2007 Productivity Meeting" for 28 Dec. 2007. Assume that user 44 invites one presenter for each of the nine one-hour event slots. Assume for illustrative purposes that the presenters invited are as follows:

| Presenter | Title |
| --- | --- |
| Jeff Barclay | Marketing |
| Jack Bauer | VP Sales |
| Christopher Cringle | VP Deliveries |
| Mary Ibanez | Sales |
| Donna Kirby | VP Logistics |
| Gardner Raynes | President/CEO |
| John Smith | VP Engineering |
| Glenn Tipton | Sales |
| Cindy L. Who | VP Marketing |

As shown in the above table, the presenters have different levels of seniority, wherein Gardner Raynes has the highest level of seniority (President/CEO) and Jeff Barclay, Mary Ibanez, and Glenn Tipton have the lowest levels of seniority (i.e. Marketing, Sales & Sales; respectively). Assume for illustrative purposes that once user 44 completes the scheduling of the "Q4 2007 Productivity Meeting", server-side scheduling process 10 may utilize e.g. a traditional e-mail system to invite the above-described nine presenters. Accordingly, server-side scheduling process 10, alone or in combination with a server-side e-mail application (e.g. Lotus Domino; not shown) may transmit an e-mail based presenter invitation to each of the above-described nine presenters. Further, user 44 may utilize the traditional e-mail system to invite the one-hundred general attendees via e-mail based general attendee invitations. While, as discussed above, there is room for one-hundred general attendees, a number larger than one-hundred (e.g. three-hundred general attendees) may be invited if it is anticipated that not everyone invited will attend. In order to avoid problems with over-inviting general attendees, server-side, scheduling process 10 may allow user 44 to accept positive responses (i.e. "I will attend") on a first-come, first-served basis.

Upon the general attendees receiving (in this example) the e-mail based general attendee invitation (not shown), the e-mail based general attendee invitation (not shown) may be configured to allow the general attendee invitee to provide a positive response via a return e-mail to server-side scheduling process 10. Alternatively, the e-mail based general attendee invitation (not shown) may instruct the recipient of the e-mail based general attendee invitation (not shown) to e.g. go to a webpage served by server computer 20 (i.e. the server computer that executes server-side scheduling process 10) so that the general attendee invitee may respond "online".

Continuing with the above-stated example, upon the above-described nine presenters receiving the e-mail based presenter invitation (not shown), the e-mail based presenter invitation (not shown) may require the presenter invitee to go "online" to select their desired event slot. As discussed above, the "Q4 2007 Productivity Meeting" may include nine one-hour event slots and nine presenters may be invited. However, unlike the general attendee invitees, whose responses are processed on a first-come, first-served basis, the responses from presenter invitees may be processed differently.

Assume for illustrative purposes that, upon the client-side scheduling process of a presenter invitee receiving the above-described e-mail based presenter invitation, the client-side scheduling process of the presenter invitee may automatically populate the calendar of the presenter invitee with an entry describing the "Q4 2007 Productivity Meeting". Assume for illustrative purposes that user 46 is representative of presenter invitee Gardner Raynes, the President and CEO of XYZ Corp. (i.e. the Corporation that is sponsoring the "Q4 2007 Productivity Meeting").

Figure 2:
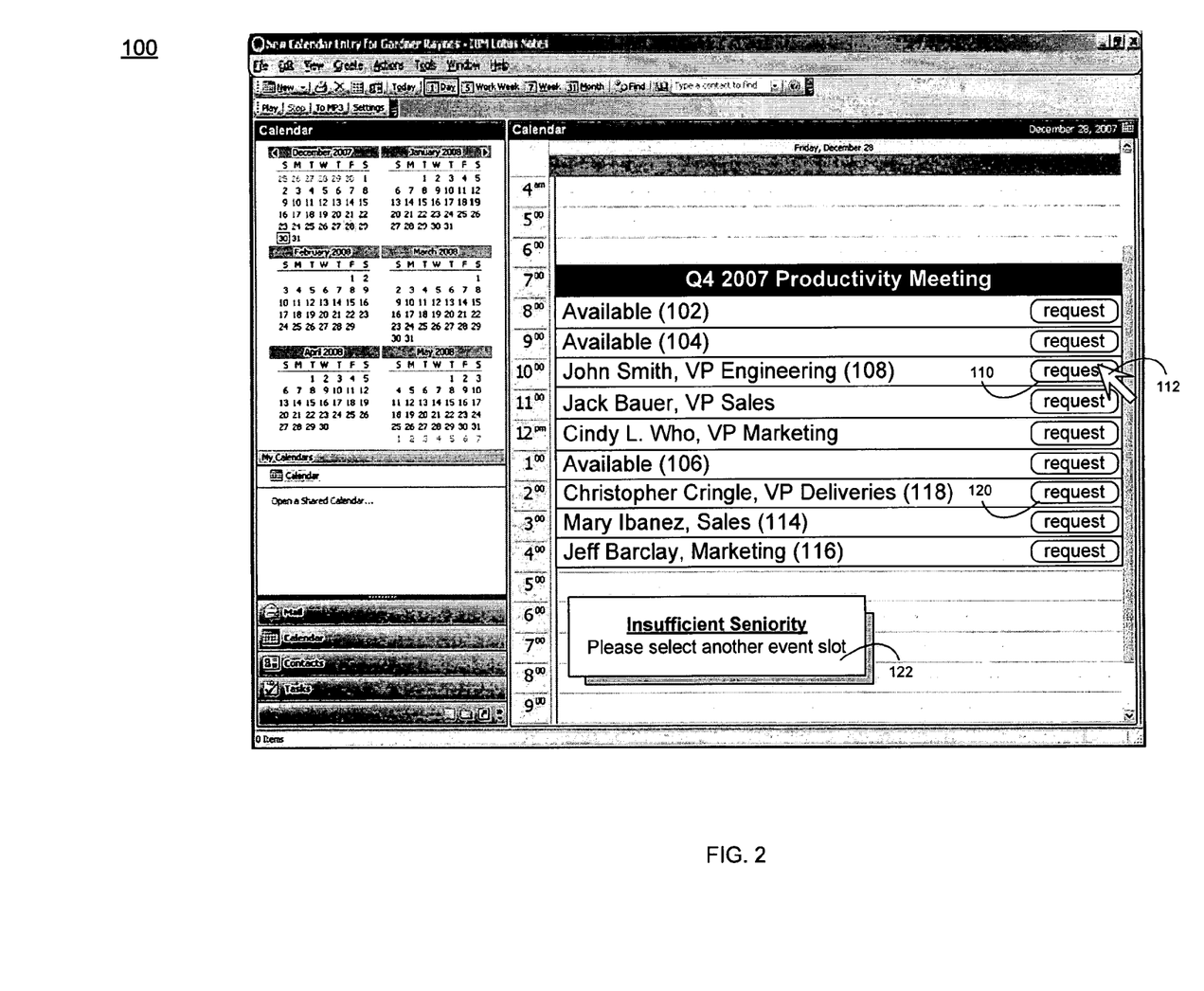
FIG. 2 is a diagrammatic view of a calendar screen rendered, at least in part, by the scheduling process of FIG. 1.

Referring also to FIG. 2 and as discussed above, upon client-side scheduling process 14 (i.e. the client-side scheduling process of user 46) receiving the above-described e-mail based presenter invitation, client-side scheduling process 14 may automatically populate the calendar of Gardner Raynes (i.e. user 46) to include a description of the "Q4 2007 Productivity Meeting". Upon Gardner Raynes (i.e. user 46) utilizing client-side scheduling process 14, calendar screen 100 may be rendered. Additionally/alternatively, the above-described e-mail based presenter invitation received by Gardner Raynes (i.e. user 46) may instruct Gardner Raynes to review 28 Dec. 2007 in their calendar so that they can select an event slot in which they wish to speak. Assume for illustrative purposes that Gardner Raynes was not in the office for a couple of days and, therefore, was unable to select a compatible event slot. For example, assume that on 28 Dec. 2007, Gardner Raynes (i.e. user 46) has a board meeting from 8:00 a.m. until 10:00 a.m. Further, assume that on 28 Dec. 2007, Gardner Raynes (i.e. user 46) is interviewing a Human Resources Vice President candidate at 1:00 p.m. Therefore, each of the remaining three available event slots (i.e. event slots 102, 104, 106) is not compatible with the schedule of Gardner Raynes.

Server-side scheduling process 10 (alone or in combination with client-side scheduling process 14) may allow Gardner Raynes (i.e. user 46) to request an event slot even though the event slot was previously requested and reserved by an earlier respondent. For example, assume that Gardner Raynes (i.e. user 46) can only give their presentation (on 28 Dec. 2007) in the event slot currently reserved by John Smith, VP Engineering. Assume for illustrative purposes that user 48 is representative of presenter invitee John Smith.

Accordingly, through server-side scheduling process 10 (alone or in combination with client-side scheduling process 14), Gardner Raynes (i.e. user 46) may request event slot 108 (i.e. 10:00 a.m.-11:00 a.m. on 28 Dec. 2007) by selecting "request" button 110 using on-screen pointer 112 (which is controllable by a pointing device, such as a mouse; not shown). Once Gardner Raynes (i.e. user 46) selects "request" button 110, slot request 62 may be provided to server-side scheduling process 10.

Figure 3:
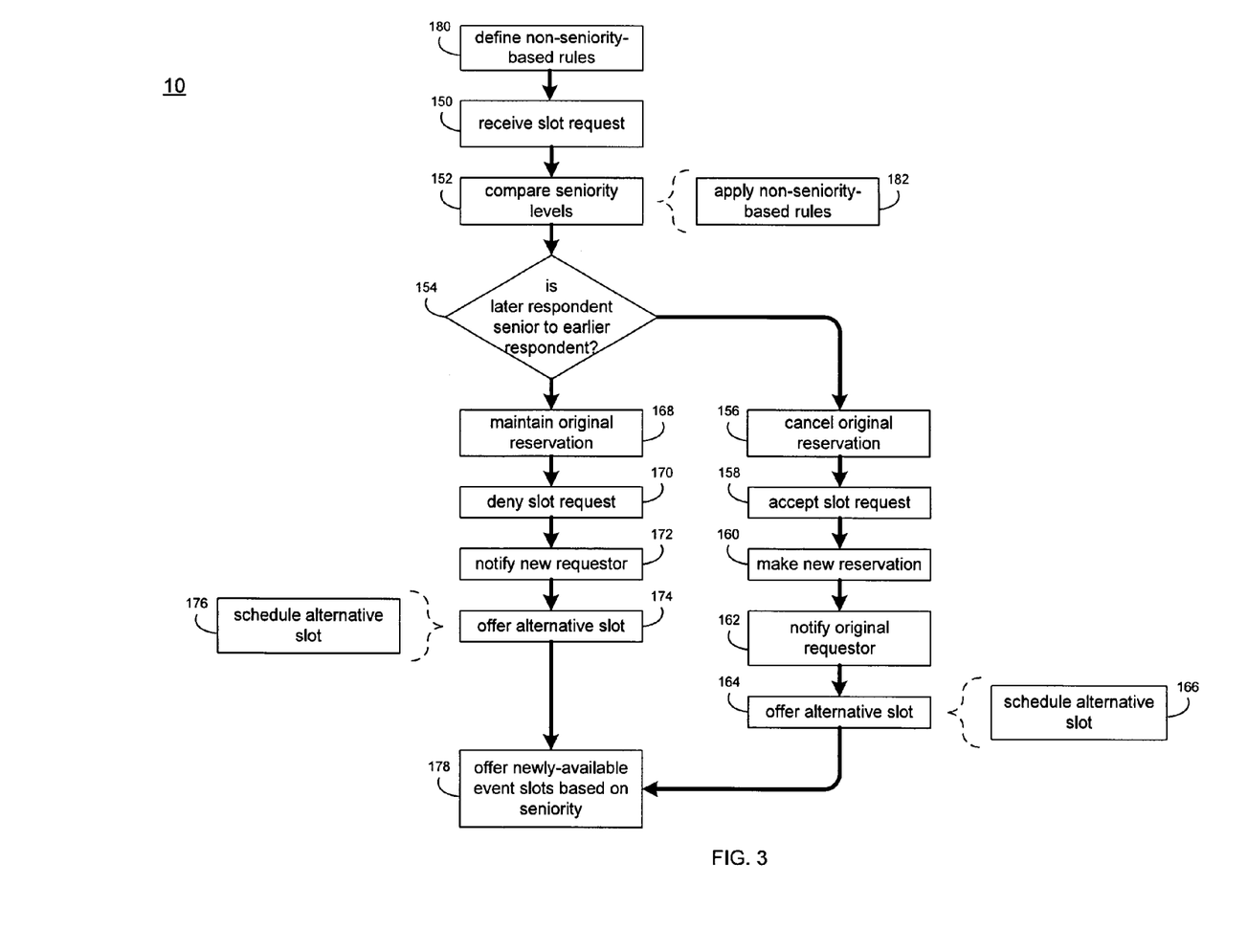
FIG. 3 is a flowchart of the scheduling process of FIG. 1.

Referring also to FIG. 3, upon server-side scheduling process 10 receiving 150 slot request 62 from Gardner Raynes (i.e. user 46) for the event slot (i.e. event slot 108) that was previously reserved by an earlier respondent (i.e. user 48), server-side scheduling process 10 may compare 152 the seniority level of the later respondent (i.e. user 46) with the seniority level of the earlier respondent (i.e. user 48).

Server-side scheduling process 10 may determine the seniority levels of each respondent via e.g. an LDAP (i.e. Lightweight Directory Access Protocol) structure that defines the hierarchical structure of XYZ Corporation. Alternatively, server-side scheduling process 10 may determine the seniority levels of each respondent via some kind of directed acyclic graph that stores organizational reporting relationships in some kind of tree structure.

Upon examining such a directory tree, server-side scheduling process 10 may determine that the seniority level of later-responding Gardner Raynes (i.e. user 46) is President/CEO and the seniority level of earlier-responding John Smith (i.e. user 48) is VP Engineering. Once the seniority levels of users 46, 48 are known, server-side scheduling process 10 may determine 154 if the seniority level of the later respondent (i.e. user 46) exceeds the seniority level of the earlier respondent (i.e. user 48).

As the later respondent (i.e. user 46) exceeds the seniority level of the earlier respondent (i.e. user 48), the reservation of event slot 108 by the earlier respondent (i.e. user 48) may be cancelled 156, and event slot request 62 for event slot 108 by the later respondent may be accepted 158. For example, the reservation of event slot 108 by user 48 may be canceled by server-side scheduling process 10. Accordingly, event slot 108 (as it appears within calendar screen 100) may be updated to list event slot 108 as "available". Further, server-side scheduling process 10 may accept 158 event slot request 62 from user 46 (i.e. Gardner Raynes) and reserve 160 event slot 108 for Gardner Raynes (i.e. user 46). Further, server-side scheduling process 10, alone or in combination with e.g. client-side scheduling process 16 (the client-side scheduling process of John Smith) may notify 162 John Smith (i.e. user 48) that his reservation of event slot 108 has been canceled 156. For example, server-side scheduling process 10, alone or in combination with the above-described server-side e-mail application may generate and provide e-mail based cancellation notification 64 to John Smith (i.e. user 48), which notifies 162 John Smith of the cancellation 156. Additionally, when generating e-mail based cancellation notification 64, server-side scheduling process 10 may offer 164 an alternative event slot (e.g. event slot 102) to John Smith (i.e. user 48). Further, server-side scheduling process 10 may automatically reserve 166 the alternative event slot (e.g. event slot 102) for John Smith (i.e. user 48).

E-mail based cancellation notification 64 may also provide John Smith with instructions concerning how John Smith can request another event slot. For example, John Smith (i.e. user 48) may use client-side scheduling process 16 to review the other unreserved event slots (i.e. event slots 104, 106) to determine if any of the unreserved event slots are compatible with the schedule of John Smith. Further, as John Smith is a vice president and, therefore, at a higher level of seniority than Mary Ibanez (Sales) and Jeff Barclay (Marketing), John Smith may request event slots 114, 116.

Continuing with the above-stated example, assume for illustrative purposes that Glenn Tipton (a salesman with XYZ Corp.) was also not in the office for a couple of days and, therefore, was unable to select a compatible event slot. For example, assume that on 28 Dec. 2007, Glenn Tipton (i.e. user 50) has a sales meeting from 8:00 a.m. until 11:00 a.m. Further, assume that on 28 Dec. 2007, Glenn Tipton (i.e. user 50) has a doctor's appointment at 1:00 p.m. Therefore, each of the remaining three available event slots (i.e. event slots 102, 104, 106) is not compatible with the schedule of Glenn Tipton.

As discussed above, server-side scheduling process 10 (alone or in combination with client-side scheduling process 18) may allow Glenn Tipton (i.e. user 50) to request an event slot even though the event slot was previously requested and reserved by an earlier respondent. For example, assume that Glenn Tipton (i.e. user 50) can only give his presentation (on 28 Dec. 2007) in the event slot currently reserved by Christopher Cringle, VP Deliveries.

Accordingly, through server-side scheduling process 10 (alone or in combination with client-side scheduling process 18), Glenn Tipton (i.e. user 50) may request event slot 118 (i.e. 2:00 p.m.-3:00 p.m. on 28 Dec. 2007) by selecting "request" button 120 using on-screen pointer 112 (which is controllable by a pointing device, such as a mouse; not shown). Once Glenn Tipton (i.e. user 50) selects "request" button 120, slot request 66 may be provided to server-side scheduling process 10.

Upon server-side scheduling process 10 receiving 150 slot request 66 from Glenn Tipton (i.e. user 50) for the event slot (i.e. event slot 118) that was previously reserved by Christopher Cringle (i.e., an earlier respondent), server-side scheduling process 10 may compare 152 the seniority level of the later respondent (i.e. Glenn Tipton) with the seniority level of the earlier respondent (i.e. Christopher Cringle).

Upon examining e.g., the above-described directory tree, server-side scheduling process 10 may determine that the seniority level of later-responding Glenn Tipton (i.e. user 50) is a Salesman and the seniority level of earlier-responding Christopher Cringle is VP Deliveries. Accordingly, server-side scheduling process 10 may determine 154 that the later respondent (i.e. Glenn Tipton) does not exceed the seniority level of the earlier respondent (i.e. Christopher Cringle). Accordingly, server-side scheduling process 10 may maintain 168 the reservation of event slot 118 by the earlier respondent (i.e. Christopher Cringle) and the slot request of Glenn Tipton (i.e. slot request 66) for event slot 118 may be denied 170. Additionally, server-side scheduling process 10 may notify 172 Glenn Tipton (i.e. user 50) that slot request 66 for event slot 118 was denied 170. For example, a pop up window (e.g. pop-up window 122) may be rendered within calendar screen 100 by client-side scheduling process 18 of user 50 (i.e. Glenn Tipton). Alternatively, server-side scheduling process 10 may generate e-mail based insufficient seniority message 68 that may be provided (via the above-described server-side e-mail application) to Glenn Tipton to notify 172 him that he has insufficient seniority to obtain event slot 118.

Additionally, when generating e-mail based insufficient seniority message 68, server-side scheduling process 10 may offer 174 an alternative event slot to Glenn Tipton (i.e., user 50). Further, server-side scheduling process 10 may automatically reserve 176 the alternative event slot for Glenn Tipton (i.e. user 50).

In the event that one or more event slots become available, server-side scheduling process 10 may offer 178 the newly-available event slots to potential attendees in an order based, at least in part, upon the seniority level of the potential attendees. For example, assume that user 44 decides to extend the length of the "Q4 2007 Productivity Meeting" by one hour. Accordingly, one additional one-hour event slot may be defined. Accordingly, when offering this additional one-hour event slot to potential attendees, server-side scheduling process 10 may first offer 178 the newly-available event slot to board members; and then to vice presidents; and then to salespeople.

Server-side scheduling process 10 may allow e.g. user 44 to define 180 one or more non-seniority-based rules when initially scheduling the "Q4 2007 Productivity Meeting". When comparing 152 the seniority levels of the later respondent and the earlier respondent, these non-seniority-based rules may be applied 182, at least in part, to determine whether the reservation of the earlier respondent should be canceled 156 or maintained 168. For example, assume that Cindy L. Who (VP Marketing) co-manages (with user 44) a particular division of XYZ Corp. Accordingly, user 44 may define 180 a rule that specifies that Cindy L. Who (VP Marketing) trumps everyone with respect to choosing an event slot within the "Q4 2007 Productivity Meeting". For illustrative purposes, these rules may be based on seniority; differential decisions with regard to the audience (e.g. John and Mary can pick their preferred slot, the other slots are first-come, first-served); or based on the moderator's sense of speaker priority, etc). In the situation where the moderator identifies speaker priorities, server-side scheduling process 10 may delay sending out some of the above-described e-mail based presenter invitations until the "priority" presenter invitees select their preferred event slot. Once this occurs, server-side scheduling process 10 may send out the remainder of the above-described e-mail based presenter invitations (which may be sent out on a first-come, first-served basis.

While calendar screen 100 is described above as identifying which slots have already been reserved and which slots are "available", this is for illustrative purposes only and is not intended to be a limitation of this disclosure, as other configurations are possible. For example, as Gardner Raynes is the President/CEO of XYZ Corp., all events slots are available to him. Accordingly, instead of identifying that six of the nine event slots have been reserved and only three of the nine event slots are available (i.e., namely event slots 102, 104, 106), server-side scheduling process 10 may identify (within calendar screen 100) all nine of the event slots as being available, as Gardner Raynes has the highest level of seniority and, therefore, is capable of reserving any event slot that he chooses (regardless of whether it has already been reserved).

Additionally, in the situation where the person looking for an available slot does not have the highest level of seniority, the slots that are unavailable to him may be "grayed out". For example, as Glenn Tipton has a low level of seniority, when Glenn Tipton looks at calendar screen 100, all slots currently reserved will be "grayed out" as unavailable to him, as the seniority level of Glenn Tipton does not exceed anyone else that has already reserved an event slot. Accordingly, server-side scheduling process 10 may not allow Glenn Tipton to request any of the event slots that are already reserved.

A number of implementations have been described. Nevertheless, it will be understood that various modifications may be made. Accordingly, other implementations are within the scope of the following claims.

What is claimed is:

1. A computer implemented method comprising:
    receiving, by a computing device, an identification of a plurality of presenters for an event;
    identifying, by the computing device, priority presenters from the plurality of presenters by processing user-defined rules for scheduling the event;
    transmitting, by the computing device, an invitation to the priority presenters for the event wherein the event is a multiple slot event including a plurality of original event slots, each original event slot representing a presentation slot for a presenter of the plurality of presenters in the multiple slot event;
    in response to receiving the invitation to the event, displaying the multiple slot event in a calendar interface viewable by at least one of the priority presenters;
    receiving, by the computing device, a slot request, from a second respondent of the priority presenters having a second seniority level, for one of the plurality of original event slots that was previously reserved by a first respondent of the priority presenters having a first seniority level;
    comparing, by the computing device, the second seniority level to the first seniority level;
    if the second seniority level exceeds the first seniority level:
        canceling, by the computing device, the reservation of the one of the plurality of original event slots by the first respondent, and
        accepting, by the computing device, the event slot request for the one of the plurality of original event slots by the second respondent; and
    if the second seniority level does not exceed the first seniority level:
        maintaining the reservation of the one of the plurality of original event slots by the first respondent, and
        denying the slot request for the one of the plurality of original event slots by the second respondent; and
    transmitting the invitation for the event to the remaining presenters of the plurality of presenters responsive to receiving a response from each of the priority presenters.

2. The computer implemented method of claim 1 further comprising:
    if the second seniority level does not exceed the first seniority level:
        notifying the second respondent that the slot request for the one of the plurality of the original event slots by the second respondent has been denied; and
        offering an alternative event slot to the second respondent.

3. The computer implemented method of claim 2 wherein offering an alternative event slot to the second respondent includes:
    automatically reserving the alternative event slot for the second respondent.

4. The computer implemented method of claim 1 further comprising:
    if the second seniority level exceeds the first seniority level:
        reserving the one of the plurality of original event slots for the second respondent, and
        notifying the first respondent that the reservation of the one of the plurality of original event slots by the first respondent has been cancelled.

5. The computer implemented method of claim 4 further comprising:
    if the second seniority level exceeds the first seniority level:
        offering an alternative event slot to the first respondent.

6. The computer implemented method of claim 5 wherein offering an alternative event slot to the first respondent includes:
    automatically reserving the alternative event slot for the first respondent.

7. The computer implemented method of claim 1 further comprising:
    offering a newly-available event slot to one or more potential attendees in an order based, at least in part, upon the seniority level of the one or more potential attendees.

8. The computer implemented method of claim 1 further comprising:
    defining one or more non-seniority-based rules, and wherein comparing the second seniority level to the first seniority level includes applying, at least in part, the one or more non-seniority-based rules to determine whether the reservation of the one of the plurality of the original event slots by the first respondent is canceled and whether the event slot request for the one of the plurality of original event slots by the second respondent is accepted.

9. The computer implemented method of claim 1 further comprising:
   determining the first seniority level and the second seniority level based upon, at least in part, a hierarchical structure.

10. The computer implemented method of claim 1 further comprising:
    allowing, via the calendar interface, the at least one presenter to request at least one of the original event slots of the multiple slot event.

11. The computer implemented method of claim 1, wherein the event slot request is accepted based upon, at least in part, a job position of the second respondent relative to that of the first respondent.

12. A computer program product residing on a computer readable storage medium having a plurality of instructions stored thereon which, when executed by a processor, cause the processor to perform operations comprising:
    receiving an identification of a plurality of presenters for an event;
    identifying priority presenters from the plurality of presenters by processing user-defined rules for scheduling the event;
    transmitting an invitation to the priority presenters for the event wherein the event is a multiple slot event including a plurality of original event slots, each original event slot representing a presentation slot for a presenter of the plurality of presenters in the multiple slot event;
    in response to receiving the invitation to the event, displaying the multiple slot event in a calendar interface viewable by at least one of the priority presenters;
    receiving a slot request, from a second respondent of the priority presenters having a second seniority level, for one of the plurality original of event slots that was previously reserved by a first respondent of the priority presenters having a first seniority level;
    comparing the second seniority level to the first seniority level;
    if the second seniority level exceeds the first seniority level:
      canceling the reservation of the one of the plurality of original event slots by the first respondent, and
      accepting the event slot request for the one of the plurality of original event slots by the second respondent; and
    if the second seniority level does not exceed the first seniority level:
      maintaining the reservation of the one of the plurality of original event slots by the first respondent, and
      denying the slot request for the one of the plurality of original event slots by the second respondent; and
    transmitting the invitation for the event to the remaining presenters of the plurality of presenters responsive to receiving a response from each of the priority presenters.

13. The computer program product of claim 12 further comprising instructions for:
    if the second seniority level does not exceed the first seniority level:
      notifying the second respondent that the slot request for the one of the plurality of original event slots by the second respondent has been denied; and
      offering an alternative event slot to the second respondent.

14. The computer program product of claim 13 wherein the instructions for offering an alternative event slot to the second respondent include instructions for:
    automatically reserving the alternative event slot for the second respondent.

15. The computer program product of claim 12 further comprising instructions for:
    if the second seniority level exceeds the first seniority level:
      reserving the one of the plurality of original event slots for the second respondent, and
      notifying the first respondent that the reservation of the one of the plurality of original event slots by the first respondent has been cancelled.

16. The computer program product of claim 15 further comprising instructions for:
    if the second seniority level exceeds the first seniority level:
      offering an alternative event slot to the first respondent.

17. The computer program product of claim 16 wherein the instructions for offering an alternative event slot to the first respondent include instructions for:
    automatically reserving the alternative event slot for the first respondent.

18. The computer program product of claim 12 further comprising instructions for:
    offering a newly-available event slot to one or more potential attendees in an order based, at least in part, upon the seniority level of the one or more potential attendees.

19. The computer program product of claim 12 further comprising instructions for:
    defining one or more non-seniority-based rules, and wherein comparing the second seniority level to the first seniority level includes applying, at least in part, the one or more non-seniority-based rules to determine whether the reservation of the one of the plurality of the original event slots by the first respondent is canceled and whether the event slot request for the one of the plurality of original event slots by the second respondent is accepted.

20. The computer program product of claim 12 further comprising instructions for:
    determining the first seniority level and the second seniority level based upon, at least in part, a hierarchical structure.

* * * * *